(12) United States Patent
Cook

(10) Patent No.: US 6,234,729 B1
(45) Date of Patent: May 22, 2001

(54) SHRINK FIT SHOULDER INTERFACE

(76) Inventor: Harold D. Cook, 33642 Via Martos, Dana Point, CA (US) 92629

( * ) Notice: Subject to any disclaimer, the term of this patent is extended or adjusted under 35 U.S.C. 154(b) by 0 days.

(21) Appl. No.: 09/301,285

(22) Filed: Apr. 28, 1999

(51) Int. Cl.⁷ .............................. B23B 51/00; B23P 11/02; F16B 4/00
(52) U.S. Cl. ........................ 408/226; 29/447; 279/102; 403/273; 409/234
(58) Field of Search ............................. 279/102; 29/447; 408/226; 409/234; 403/273

(56) References Cited

U.S. PATENT DOCUMENTS

| 845,717 | 2/1907 | Miller | 403/370 |
|---|---|---|---|
| 1,285,589 | 11/1918 | Barnes . | |
| 1,404,016 | 1/1922 | Engelbrekt . | |
| 1,409,753 | 3/1922 | Moore . | |
| 1,539,413 | 5/1925 | Fish . | |
| 1,658,504 | 2/1928 | Weiss . | |
| 1,936,498 | 11/1933 | Corbett | 76/108 |
| 1,994,792 | 3/1935 | Sanderson | 255/63 |
| 2,058,618 | 10/1936 | Patzig | 403/273 |
| 2,125,005 | 7/1938 | Jearum | 29/96 |

(List continued on next page.)

FOREIGN PATENT DOCUMENTS

| 575009 | 4/1933 | (DE) . | |
|---|---|---|---|
| 662704 | 6/1938 | (DE) . | |
| 1008546 | 5/1957 | (DE) . | |
| 1008085 | 10/1957 | (DE) . | |
| 1238311 | 4/1967 | (DE) . | |
| 2229374 | 1/1974 | (DE) | 279/1 A |
| 2759007 | 8/1978 | (DE) | 408/239 A |
| 2811977 | 9/1979 | (DE) . | |
| 3701602 | 8/1988 | (DE) . | |
| 3925641C2 | 9/1992 | (DE) . | |
| 0026751 | 11/1981 | (EP) | 279/11 S |
| 382079B1 | 8/1993 | (EP) . | |
| 425539 | 4/1935 | (GB) . | |
| 551065 | 2/1942 | (GB) . | |
| 729295 | 5/1955 | (GB) | 279/8 |
| 921522 | 3/1963 | (GB) | 340/279 |
| 1319200 | 6/1973 | (GB) . | |
| 2137124A | 10/1984 | (GB) | 279/7 |
| 53-16976 | 2/1978 | (JP) | 279/1 A |
| 57-107710 | 5/1982 | (JP) | 279/9.1 |
| 376182 | 5/1979 | (SU) . | |
| 1493389 | 7/1989 | (SU) . | |

OTHER PUBLICATIONS

Coolant Adapters (Flush Cut) by X–L Tool Company; 1 page.

MI–Tech Metals, Inc., "High Density Tungsten Based Metals" 4 pages.

*Primary Examiner*—Steven C. Bishop
(74) *Attorney, Agent, or Firm*—Stetina Brunda Garred & Brucker

(57) ABSTRACT

A machine tool extension for use with a cutting tool having a generally cylindrical shank portion. The machine tool extension comprises an elongate, generally cylindrical shank which is fabricated from a thermally expandable material and includes a first end and a second end which defines a peripheral edge. Extending axially within the second end of the shank is a bore having a diameter which is slightly less than the diameter of the shank portion of the cutting tool. The second end of the shank is formed with a slight inward radial taper such that the bore terminates inwardly of the peripheral edge of the second end.

7 Claims, 1 Drawing Sheet

U.S. PATENT DOCUMENTS

| | | | |
|---|---|---|---|
| 2,161,062 | 6/1939 | Killgore | 262/33 |
| 2,374,919 | 5/1945 | Bruseth | 90/11 |
| 2,729,458 | 1/1956 | Sacrey | 279/41 |
| 2,860,547 | 11/1958 | Stephan | 90/11 |
| 2,893,291 | 7/1959 | Hollis | 90/11 |
| 2,913,935 | 11/1959 | Flannerty et al. | 77/58 |
| 2,918,290 | 12/1959 | Werstein | 279/19 |
| 2,920,913 | 1/1960 | Antila | 287/119 |
| 2,942,891 | 6/1960 | Zale | 279/1 |
| 3,053,118 | 9/1962 | Lavallee | . |
| 3,221,404 | 12/1965 | Averill et al. | 29/568 |
| 3,307,243 | 3/1967 | Andreasson | 29/106 |
| 3,372,951 | 3/1968 | McCash | 287/91 |
| 3,382,563 * | 5/1968 | Barroil et al. | 29/447 |
| 3,397,615 | 8/1968 | Meinke | 90/11 |
| 3,424,055 | 1/1969 | Rollat | 90/11 |
| 3,463,048 | 8/1969 | Owsen | 90/11 |
| 3,557,419 | 1/1971 | Flannery | 29/105 |
| 3,643,546 | 2/1972 | Richter et al. | 90/11 A |
| 3,678,632 | 7/1972 | Eversole et al. | 408/144 |
| 3,725,994 | 4/1973 | Wechsler | 29/447 |
| 3,734,515 | 5/1973 | Dudek | 279/1 A |
| 3,807,804 | 4/1974 | Kniff | 299/91 |
| 3,876,320 | 4/1975 | Phillpson | 403/370 |
| 3,937,587 | 2/1976 | Lindem et al. | 408/181 |
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,298,208 | 11/1981 | Benjamin et al. | 279/91 |
| 4,305,203 | 12/1981 | Bock et al. | 29/800 |
| 4,377,292 | 3/1983 | Staron | 279/46 R |
| 4,436,463 | 3/1984 | Rea | 409/232 |
| 4,453,775 | 6/1984 | Clemmow | 299/81 |
| 4,483,108 | 11/1984 | Howard | 408/144 |
| 4,560,289 | 12/1985 | Wood, III | 384/99 |
| 4,619,564 | 10/1986 | Jacobson | 408/146 |
| 4,642,005 | 2/1987 | Kondo et al. | 409/232 |
| 4,647,052 * | 3/1987 | Butikofer | 409/234 |
| 4,668,138 | 5/1987 | Carter | 409/234 |
| 4,795,292 | 1/1989 | Dye | 409/136 |
| 4,808,049 | 2/1989 | Cook | 409/234 |
| 4,811,632 | 3/1989 | Salyer | 76/24 R |
| 4,818,161 | 4/1989 | Cook | 409/233 |
| 4,934,743 | 6/1990 | Kapgan et al. | 285/23 |
| 4,971,491 | 11/1990 | Cook | 409/131 |
| 4,991,991 | 2/1991 | Ito et al. | 403/30 |
| 4,993,894 | 2/1991 | Fischer et al. | 408/14 |
| 5,024,563 | 6/1991 | Randall | 408/144 |
| 5,048,375 | 9/1991 | Kobayashi | 76/108 |
| 5,052,610 | 10/1991 | Guerra et al. | 403/273 |
| 5,098,234 | 3/1992 | Judkins et al. | 408/204 |
| 5,150,636 | 9/1992 | Hill | 76/108.2 |
| 5,277,435 | 1/1994 | Kramer et al. | 2779/9.1 |
| 5,278,354 | 1/1994 | Lhomme | 174/84 R |
| 5,280,671 | 1/1994 | Marquart | . |
| 5,311,654 | 5/1994 | Cook | 29/447 |
| 5,352,074 | 10/1994 | Ishikawa | 409/232 |
| 5,582,494 | 12/1996 | Cook | 409/234 |
| 5,593,258 | 1/1997 | Matsumoto et al. | 409/234 |
| 5,775,857 | 7/1998 | Johne | 409/234 |
| 5,797,605 | 8/1998 | Gross et al. | 279/4.05 |

* cited by examiner

SHRINK FIT SHOULDER INTERFACE

FIELD OF THE INVENTION

The present invention relates generally to machine tools, and more particularly to a heat shrink extension for interfacing a cutting tool to a tool holder.

BACKGROUND OF THE INVENTION

As is well known, various tool holders have been utilized in the prior art which interface with a rotating spindle of a machine, such as a milling or boring machine, to securely hold a cutting tool upon the machine during the cutting of a workpiece. In most prior art tool holders, a central aperture is formed therein for receiving the shank portion of the cutting tool which is to be interfaced to the milling or other machine. Subsequent to the insertion of the shank portion of the cutting tool into the central aperture, the tool holder is drawn or pulled tightly into the spindle so as to rigidly maintain the cutting tool within the tool holder and the machine.

However, prior art tool holders suffered from deficiencies resulting from the manner in which the shank portion of the cutting tool is secured within the central aperture of the tool holder, thereby often resulting in non-concentric mounting of the cutting tool within the tool holder. Such non-concentric mounting is extremely undesirable, particularly in modern, high tolerance machining applications such as those performed on a vertical milling machine wherein minor variations in the concentricity of the cutting tool within the tool holder oftentimes results in extreme flaws in the cutting operation.

Recently, heat shrink tool holders and have gained popularity in high tolerance machining applications for their ability to mount a cutting tool concentrically within the tool holder. In such tool holders, the central aperture is sized slightly smaller than the diameter of the shank of the cutting tool. The cutting tool is only insertable into the central aperture when the tool holder has been heated to the temperature necessary to thermally expand the central aperture to a size which can accept the cutting tool shank. Subsequent to the insertion of the shank thereinto, the tool holder is allowed to cool to ambient temperature, thereby decreasing the size or diameter of the central aperture and rigidly maintaining the cutting tool shank within the tool holder.

Additionally, heat shrink extensions have been used to interface cutting tools to tool holders. Such extensions are typically formed with a bore extending axially within one end, with the opposite end being insertable into the tool holder of the milling or boring machine. Similar to the central aperture of the heat shrink tool holder, the bore of the extension is sized slightly smaller than the shank of the cutting tool such that the shank is insertable therein only when the extension is heated to a temperature sufficient to thermally expand the bore to a size which can accept the tool shank. Subsequent to the insertion of the shank thereinto, the cooling of the extension and resultant thermal contraction of the bore creates a metal to metal press fit between the extension and the shank of the cutting tool, thereby rigidly securing the cutting tool to the extension.

However, prior art heat shrink extensions suffer from a particular deficiency which detracts from their overall utility. More particularly, in such prior art extensions, the cutting tool shank is typically not fully drawn into the bore of the extension as the same is cooled to ambient temperature, thus resulting in the creation of a "gap" between the cutting head of the cutting tool and the extension. In view of this gap, the cutting head of the cutting tool is not in metal to metal contact with the extension, nor is the shank of the cutting tool completely supported by the extension in that a portion of the shank between the extension and the cutting head of the cutting tool is exposed. As will be recognized, the unsupported portion of the shank is more susceptible to being sheared off during horizontal milling operations. Additionally, the gap between the cutting head of the cutting tool and the extension is not desirable since in vertical milling and boring operations, metal to metal contact between the cutting head and the extension is needed to provide the strongest union between these two components and to insure a consistent depth of penetration of the cutting head into a work piece. The problems associated with the formation of the above-described gap not only occur in relation to the use of heat shrink extensions, but also when inserting a cutting tool into a prior art heat shrink tool holder. Thus, there exists a need in the art for heat shrink extensions or tool holders that prevent the formation of a gap between the cutting tool and the extension or tool holder upon the same being cooled to ambient temperature.

The present invention addresses the deficiencies in prior art heat shrink extensions by providing a heat shrink extension which, when cooled to ambient temperature, is adapted to eliminate any gap or void between the extension and the cutting head of the cutting tool which is inserted thereinto. Importantly, the interface provided on the extension to eliminate the gap may also be incorporated into the cutting tool itself, or to a heat shrink tool holder. Whether included on the extension, the tool holder, or the cutting tool, the purpose of the interface is to eliminate any gap between the extension or tool holder and the cutting tool attributable to the heat shrink engagement technique, thus providing the strongest union between the connected components.

SUMMARY OF THE INVENTION

In accordance with the present invention, there is provided a machine tool extension for use with a cutting tool which includes a generally cylindrical shank portion, a cutting head portion, and an annular shoulder which is defined between the shank and cutting head portions. The machine tool extension itself comprises an elongate, generally cylindrical shank having a first end, and a second end which defines a continuous peripheral edge. Extending axially within the second end of the shank is a circularly configured bore having a diameter which is slightly less than the diameter of the shank portion of the cutting tool. More particularly, the bore is preferably formed to have a diameter of about 0.0003 to 0.001 inches less than the diameter of the shank portion of the cutting tool.

In addition to being provided with the bore extending axially therein, the second end of the shank is also formed with a slight inward radial taper such that the bore terminates inwardly of the peripheral edge thereof. More particularly, the taper is sloped such that the bore terminates about 0.0015 inches inwardly of the peripheral edge of the second end, thus causing the second end to assume a slightly concave configuration. The extension is fabricated from a thermally expandable metal material so that the application of heat thereto via an external heat source facilitates the thermal expansion or enlargement of the diameter and axial length of the bore.

In using the machine tool extension of the present invention to interface the cutting tool to a tool holder or to the rotating spindle of a machine, the machine tool extension is initially heated to a temperature sufficient to thermally expand the bore to a diameter slightly exceeding that of the shank of the cutting tool. Thereafter, the shank of the cutting tool is slidably inserted into the bore such that the shoulder of the cutting tool is abutted directly against the peripheral edge of the second end. As will be recognized, due to the second end being formed with the inward radial taper, the abutment of the shoulder against the peripheral edge results in the formation of a gap between the shoulder and that portion of the second end extending radially inward from the peripheral edge. As will be recognized, the maximum width of this gap is about 0.0015 inches when the shoulder is abutted against the peripheral edge. The machine tool extension is then cooled to ambient temperature. Importantly, such cooling effectively draws the shank into the bore from the axial contraction of the bore in a manner eliminating the gap between the second end of the machine tool extension and the shoulder of the cutting tool.

The interface of the extension (i.e., the inward radial taper formed within the second end of the extension) may also be included in the cutting tool itself or in a heat shrink tool holder. If included in the cutting tool itself, the shoulder defined between the cutting head and shank portions of the cutting tool would be provided with a radial taper. Additionally, that portion of the heat shrink tool holder against which the cutting head portion would be abutted when the shank portion was fully inserted into the tool holder would be provided with the inward radial taper.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
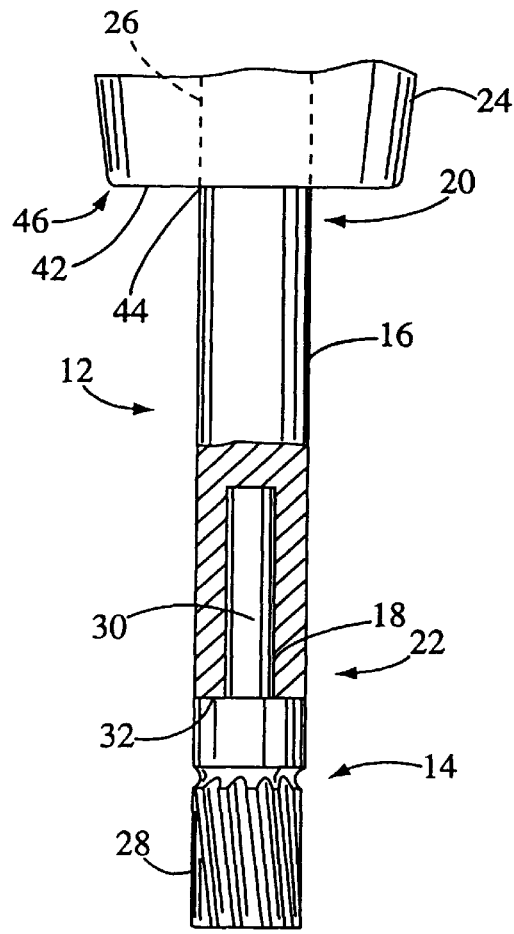
FIG. 1 is a partial cross-sectional view illustrating the heat shrink machine tool extension of the present invention as used to interface a cutting tool to a tool holder.

Referring now to the drawings wherein the showings are for purposes of illustrating a preferred embodiment of the present invention only, and not for purposes of limiting the same, FIG. 1 is a cross-sectional view of a machine tool extension 12 secured to a cutting tool 14 by a heat shrink process and using the preferred embodiment of the present invention. Additional information and explanation about heat shrink processes, tool holders and fittings may be found in Applicant's U.S. Pat. Nos. 5,311,654 and 5,582,494 which are incorporated by reference herein.

More specifically, machine tool extension 12 comprises an elongate generally cylindrical shank 16 with a first end 20, a second end 22 and a circular cross-sectional bore 18 extending axially within second end 22. As can be seen in FIG. 1, first end 20 of extension 12 is slidably insertable into either a conventional or heat shrink tool holder 24 of a cutting, milling or boring machine. The machine tool extension 12 can be fabricated from a thermally expandable material such as alloy or tool steel and is preferably secured to tool holder 24 by a heat shrink fitting technique. In order to secure extension 12 to tool holder 24 via a heat shrink technique using a gas flame or infra-red heating method, tool holder 24 must be fabricated from a thermally expandable material with a coefficient of thermal expansion different than tool extension 12 such that tool holder 24 and extension 12 do not expand at the same rate upon application of heat. However, if tool holder 12 is heated by an induction heating method, then tool holder 24 and extension 12 may be fabricated from materials with the same coefficient of thermal expansion since tool holder 24 will be heated and therefore expand before tool extension 12 begins to heat and expand. As such, tool holder 24 configured as a heat shrink fitting has a generally circular cross-sectional central opening 26 that is slightly smaller in diameter than the diameter of shank 16 of extension 12 at the location of first end 20.

In order to insert shank 16 of extension 12 into central opening 26, tool holder 24 is heated to a temperature sufficient to thermally expand the diameter of opening 26 to a size greater than the diameter of shank 16. After the application of heat to tool holder 24, the first end 20 of extension 12 is inserted into central opening 26 of tool holder 24 and then tool holder 24 is allowed to cool to ambient temperature. As tool holder 24 cools to ambient temperature, the thermally expandable material of tool holder 24 begins to contract and thereby reduce the diameter of central opening 26 thus creating metal to metal contact between tool extension 12 and tool holder 24. Therefore, at ambient temperature, tool extension 12 is rigidly secured in tool holder 24 via the heat shrink fitting technique that accurately centers and secures extension 12 into tool holder 24.

As further shown in FIG. 1, a cutting tool 14, used in conjunction with an extension 12, comprises a cutting head 28 and a shank portion 30 extending from a non-cutting surface of the tool 14. The cutting head 28 defines an annular shoulder 32 at the base of the shank portion 30. Cutting head 28 can be any type of cutting head known in the art and used for cutting or grinding metal or composite materials. Furthermore, shank portion 30 is generally cylindrical and has a diameter slightly larger (i.e. about 0.0003 to 0.001 inches greater) than the diameter of bore 18 when used with heat shrink securing techniques. Therefore, similar to the steps required for the insertion of extension 12 into the tool holder 24, extension 12 is heated to a temperature sufficient to thermally expand the diameter of bore 18 to a size slightly larger than the diameter of shank portion 30 of cutting tool 14. After the application of heat, shank portion 30 is inserted into bore 18 and extension 12 is allowed to cool to ambient temperature. As such, shank portion 30 thermally contracts and the diameter of bore 18 decreases thereby creating metal to metal contact between extension 12 and shank portion 30. Therefore, cutting tool 14 is rigidly secured to extension 12 at ambient temperature via the heat shrink fitting technique.

Figure 2:
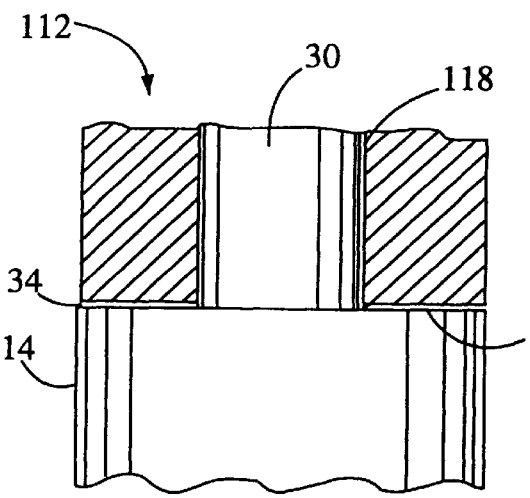
FIG. 2 is a partial cross-sectional view of a prior art heat shrink machine tool extension, illustrating the gap that is normally defined between the extension and a cutting tool connected thereto.

However, as can be seen in FIG. 2, prior art heat shrink fittings and techniques suffer a major drawback whereby a space or gap 34 forms between the cutting tool 14 and the prior art machine tool extension 112. Prior art heat shrink machine tool extension 112 is similar to the heat shrink tool extension 12 of the present invention in that prior art extension 112 is an elongate generally cylindrical shank fabricated from a thermally expandable material. Extending axially within from one end of the prior art tool extension 112 is a circular cross sectional bore 118 with a diameter slightly smaller than the diameter of shank portion 30 of cutting tool 14. Therefore, in order to secure cutting tool 14 to prior art tool extension 112, heat is applied to extension 112 to thermally expand the diameter of bore 118 to a size slightly larger than the diameter of shank portion 30 of cutting tool 14. Subsequent to the application of heat, shank portion 30 is inserted into prior art extension 112 and extension 112 is allowed to cool to ambient temperature. As extension 112 cools, it thermally contracts and rigidly secures shank portion 30 to prior art extension 112; however, a gap 34 is formed between the two parts (prior art extension 112 and cutting tool 14) because cutting tool 14 is not drawn toward extension 112 during the cooling process.

The gap 34 creates a space or void between prior art extension 112 and cutting tool 14 that is not preferred when a cutting force is applied in a downward direction onto extension 112. Since there is no metal to metal contact between the top surface of cutting tool 14 and the bottom of extension 112, the downward force is transferred entirely through shank portion 30 to cutting head 28 rather than through the shoulder 32 of machine tool 14. Additionally, gap 34 can lead to imprecise milling or grinding work since cutting tool 14 is not fully inserted into prior art tool extension 112. As will be recognized, it is not possible for cutting tool 14 to be consistently positioned in prior art extension 112 for vertical milling or boring since the gap 34 is not always consistent.

Furthermore gap 34 is undesirable because it can lead to the failure of shank portion 30 from shear forces applied to cutting head 28. Shank portion 30 is not fully supported by the prior art extension 112 near the area of the gap 34 as can be seen in FIG. 2. Therefore, the bottom-most portion of shank portion 30 is unsupported and prone to failure from the application of shear forces.

Figure 3:
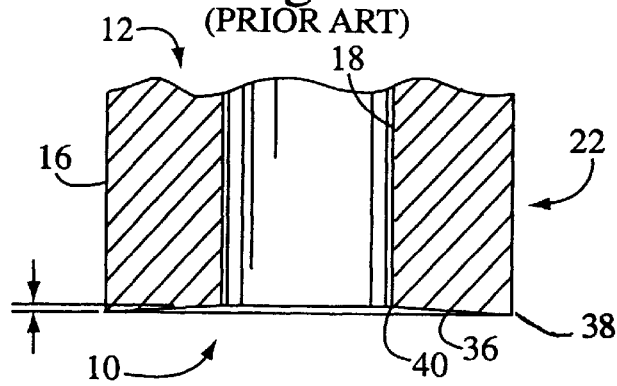
FIG. 3 is a partial cross-sectional view of one end of the machine tool extension shown in FIG. 1, illustrating the interface or inward radial taper formed therein.

As can be seen in FIG. 3, an extension 12 manufactured in accordance with the preferred embodiment of the present invention is formed with a slight inward radial taper 36 on the second end 22 of shank 16 that serves as a heat shrink interface 10. The taper 36 is sloped such that the peripheral edge 38 of the second end 22 extends about 0.0015 inches beyond the termination 40 of bore 18 as shown by the arrows if FIG. 3. Therefore, second end 22 is formed with a slightly concave configuration that functions as an interface between the extension 12 and tool 14. In the preferred mode of operation, radial taper 36 causes cutting tool 14 to be effectively drawn toward extension 12 in a manner to eliminate gap 34 while extension 12 is cooling to ambient temperature. As will be recognized, extension 12 expands in both a radial direction for insertion of the bore 18 of tool 14, as well as in an axial direction along the length of bore 18 when extension 12 is heated. Therefore, as extension 12 cools to ambient temperature the diameter and the length of bore 18 will contract so as to draw cutting tool 14 into extension 12. The radial taper 36 eliminates gap 34 from forming by allowing bore 18 to contract axially and thus preventing the deficiencies in the prior art heat shrink fittings and techniques previously mentioned.

Figure 4:
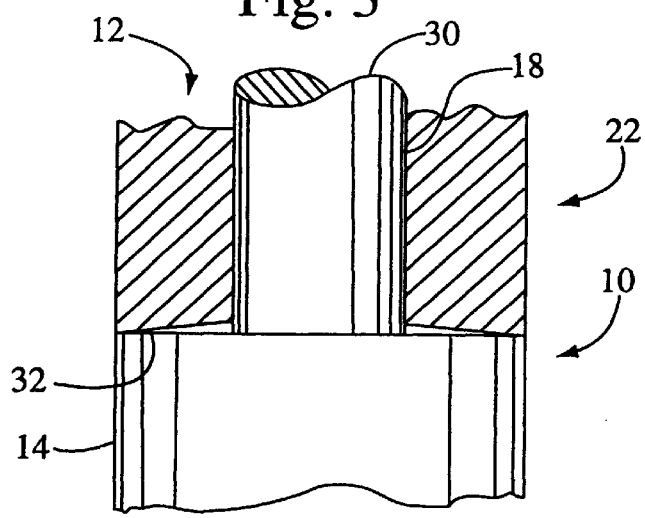
FIG. 4 is a partial cross-sectional view illustrating the manner in which the interface of the present machine tool extension effectively eliminates any gap between the extension and the cutting tool when the cutting tool is connected thereto.

Referring now to FIG. 4, a cutting tool 14 is secured to extension 12 through the use of the heat shrink technique previously described. Therefore, shank portion 30 is inserted into bore 18 when extension 12 has been heated to a temperature sufficient to thermally expand the diameter of bore 18 slightly larger than the diameter of shank portion 30. However, unlike the prior art heat shrink fittings, as extension 12 cools, the shank portion 30 of cutting tool 14 is drawn up into the bore 18 of extension 12 as the axial length of bore 18 contracts. As extension 12 and cutting tool 14 cool to ambient temperature, the radial taper 36 formed on the second end 22 of extension 12 functions to draw cutting tool 14 and extension 12 together from the axial contraction of bore 18 until cutting tool 14 abuts extension 12 around the peripheral edge of cutting tool 14. Therefore, as shown in FIGS. 1 and 4, the annular shoulder 32 of cutting tool 14 makes metal to metal contact with extension 12 around the peripheral edge thereby eliminating a gap or space between the cutting tool 14 and the machine tool extension 12.

The present invention has been described as being fabricated upon a machine tool extension 12. However, as those skilled in the art will appreciate, the heat shrink interface (i.e., the inward radial taper) may be fabricated upon other machine tool parts as well. As by way of example, the interface 10 may be formed upon the cutting tool 14. Accordingly, shoulder 32 of cutting head 28 would be formed with an inward radial taper toward the base of shank portion 30 such that the peripheral edge of cutting head 28 would be about 0.0015 inches above the base of shank 30. A cutting tool 14 formed with such radial taper must be used with tool holders and extensions that have planar surfaces that will contact with the tapered shoulder of tool 14. In order for the heat shrink interface to operate correctly and thereby effectively draw cutting tool 14 down onto the tool holder or extension while cooling, the interface must be in contact with the planar receiving surface of the tool holder or extension. Therefore, if the cutting tool 14 is formed with a radial taper, the tool holder or extension that it is to be used with must also be formed with a planar receiving surface.

Additionally, as will be recognized, the interface 10 may be fabricated directly upon a tool holder 24. Referring to FIG. 1, the radial taper would be formed upon a shoulder 42 of tool holder 24. Shoulder 42 is defined by the surface area between the outer circumference of central opening 44 and the peripheral edge 46 of tool holder 24. When used with a tool holder 24 having a heat shrink interface fabricated thereon, the cutting tool 14 must have a generally planar non-cutting surface. The planar non-cutting surface of the cutting tool will make contact around the peripheral edge of the radial taper formed upon the tool holder thereby drawing the cutting tool 14 into the tool holder as the tool holder cools to ambient temperature. As such, any gap or space will be eliminated between the two parts when secured thereby providing a strong union between the two.

Therefore, the present invention provides an interface between two machine tools that eliminates any gap from forming between the two parts. When using a prior art heat shrink tool extension 112 as shown in FIG. 2, a gap 34 forms between the cutting tool 14 and the extension 112. However, when the interface 10 is fabricated upon a heat shrink tool extension 12, the gap 34 is eliminated and the extension 12 and cutting tool 14 make metal to metal contact around the peripheral edge to thereby provide the strongest method of joining the two parts.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A machine tool extension for use with a cutting tool having a generally cylindrical shank portion, the machine tool extension comprising:

an elongate, generally cylindrical shank having a first end and a second end which defines a peripheral edge; and a solely distally enterable and thermally expandable bore extending axially within the second end of the shank, said bore when not thermally expanded having a diameter which is slightly less than the diameter of the shank portion of the cutting tool;

the second end of the shank being formed with a slight inward radial taper such that the bore terminates inwardly of the peripheral edge of the second end.

2. The extension of claim 1 wherein the bore terminates about 0.0015 inches inwardly of the peripheral edge of the second end.

3. The extension of claim 2 wherein the bore is formed to have a diameter of about 0.0003 to 0.001 inches less than the diameter of the shank portion of the cutting tool.

4. A machine tool extension for use with a cutting tool having a generally cylindrical shank portion, a cutting head portion, and an annular shoulder defined between the shank and cutting head portions, the machine tool extension comprising:

an elongate, generally cylindrical shank having a first end and a second end which defines a peripheral edge; and a solely distally enterable and thermally expandable bore extending axially within the second end of the shank, said bore when not thermally expanded having a diameter which is slightly less than the diameter of the shank portion of the cutting tool;

the second end of the shank being formed with a slight inward radial taper such that a gap is defined between the shoulder of the cutting tool and that portion of the second end extending radially inward from the peripheral edge thereof when the shank portion of the cutting tool is fully inserted into the thermally expanded bore and the shoulder is abutted against the peripheral edge.

5. The machine tool extension of claim 4 wherein the gap has a maximum width of about 0.0015 inches when the shoulder is abutted against the peripheral edge.

6. The machine tool extension of claim 5 wherein the bore is formed to have a diameter of about 0.0003 to 0.001 inches less than the diameter of the shank portion of the cutting tool.

7. A method of securing a cutting tool having a generally cylindrical shank portion, a cutting head portion, and an annular shoulder defined between the shank and cutting head portion to a machine tool extension, the method comprising the steps of:

a) providing a machine tool extension which is fabricated from a thermally expandable material and comprises:

an elongate, generally cylindrical shank having a first end and a second end which defines a peripheral edge; and a solely distally enterable and thermally expandable bore extending axially within the second end of the shank, said bore when not thermally expanded having a diameter which is slightly less than the diameter of the shank portion of the cutting tool;

the second end of the shank being formed with a slight inward radial taper such that the bore terminates inwardly of the peripheral edge;

b) heating the machine tool extension to a temperature sufficient to thermally expand the bore to a size whereby the tool shank is insertable thereinto;

c) inserting the shank into the bore such that the shoulder of the cutting tool is abutted against the peripheral edge and a edge and a gap is defined between the shoulder and that portion of the second end extending radially inward from the peripheral edge; and d) cooling the machine tool extension to ambient temperature so as to draw the shank into the bore in a manner eliminating the gap between the machine tool extension and the cutting tool.

* * * * *